(12) United States Patent
Carroll et al.

(10) Patent No.: US 6,285,757 B1
(45) Date of Patent: Sep. 4, 2001

(54) INTERACTIVE DEVICES AND METHODS

(75) Inventors: David W. Carroll, Northfield; Wendell L. Carroll, Minneapolis; James L. Carroll, Northfield; Steven V. Case, Eagan, all of MN (US); Matthew H. Rust, Hudson, WI (US)

(73) Assignee: ViA, Inc., Burnsville, MN (US)

( * ) Notice: Subject to any disclaimer, the term of this patent is extended or adjusted under 35 U.S.C. 154(b) by 0 days.

(21) Appl. No.: 09/187,800

(22) Filed: Nov. 6, 1998

Related U.S. Application Data

(60) Provisional application No. 60/064,940, filed on Nov. 7, 1997.

(51) Int. Cl.[7] ..................................................... H04M 1/00
(52) U.S. Cl. ............................................................ 379/433
(58) Field of Search .................................... 379/433, 428, 379/96.03; 455/575, 90; 368/4, 10, 13, 47, 281, 282

(56) References Cited

U.S. PATENT DOCUMENTS

| | | |
|---|---|---|
| D. 351,106 | 10/1994 | Frazier . |
| D. 369,751 | 5/1996 | Boyer et al. . |
| D. 402,654 | 12/1998 | Consolo . |
| D. 407,654 | 4/1999 | Rayon . |
| 4,754,285 | 6/1988 | Robitaille . |
| 4,803,487 | 2/1989 | Willard et al. . |
| 4,847,818 | 7/1989 | Olsen . |
| 5,008,864 | 4/1991 | Yoshitake . |
| 5,239,521 | 8/1993 | Blonder . |
| 5,285,398 | 2/1994 | Janik . |
| 5,305,181 | 4/1994 | Schultz . |
| 5,381,387 | 1/1995 | Blonder et al. . |
| 5,467,324 | 11/1995 | Houlihan . |
| 5,491,651 | 2/1996 | Janik . |
| 5,499,292 | 3/1996 | Blonder et al. . |
| 5,555,490 | 9/1996 | Carroll . |
| 5,564,082 | 10/1996 | Blonder et al. . |
| 5,572,401 | 11/1996 | Carroll . |
| 5,581,492 | 12/1996 | Janik . |
| 5,659,611 | 8/1997 | Saksa . |
| 5,798,907 | 8/1998 | Janik . |
| 5,799,068 | * 8/1998 | Kikinis et al. ..................... 379/93.06 |
| 5,819,183 | 10/1998 | Voroba et al. . |
| 5,889,737 | 3/1999 | Alameh et al. . |
| 5,929,771 | 7/1999 | Gaskill . |

FOREIGN PATENT DOCUMENTS 0 809 172 A2   11/1997   (EP) .

* cited by examiner

Primary Examiner—Jack Chiang
(74) Attorney, Agent, or Firm—Dicke, Billig & Czaja, P.A.

(57) ABSTRACT

A body-wearable interactive device with a retractable earbud and a microphone provides data, audio and voice communication with a wearable personal computing or other remote device. Full voice and display interface with a personal computer can be achieved with the use of a wireless link between the input/output device and computer. The device is adapted for use with a variety of ancillary communications devices to provide flexibility in field and mobile communications scenarios. Corresponding methods are also disclosed by which a wearer can effect communication through and with the interactive device.

40 Claims, 3 Drawing Sheets

Fig. 1

INTERACTIVE DEVICES AND METHODS

CROSS REFERENCE TO RELATED APPLICATION

This application is directed to subject matter that is related to the subject matter of commonly assigned U.S. Provisional Application Ser. No. 60/064,940, filed Nov. 7, 1997, priority to which is claimed under 35 U.S.C. §119(e) and which is incorporated herein by reference in its entirety.

BACKGROUND OF THE INVENTION

1. Field of the Invention

The invention relates to input/output devices for use with computing devices, and more particularly, to wrist-worn interactive devices for voice, audio, and/or video communication with wearable personal computers, according to one embodiment.

2. Description of Related Art

Portable, voice-oriented communication devices, e.g. voice-recognition devices and cellular telephones, have enjoyed tremendous popularity. Although such devices have become smaller with advancing technology, many commercially available models have a rather box-like shape and/or are somewhat awkward to carry and use. Other disadvantages of current, portable voice-communication technology include durability problems, inadequate processing power, and excess weight.

Other portable, personal communication devices, for example pagers, have suffered similar problems. One attempt to improve pager technology is shown in U.S. Pat. No. 4,803,487 to Willard, which is incorporated herein by reference. A remote transmitter broadcasts a page on a first communication channel to a portable radio receiver, which is mounted, e.g., on a user's belt. The receiver then retransmits the page on a second communications channel to a separate, wrist-worn message presentation unit. Communication on the second channel can be by example RF, IR, or ultrasonic transmission. Although possibly beneficial for use in some situations, in essence the Willard device is merely a pager that requires mounting on the body at two separate locations. It apparently has extremely limited processing, input/output and other capabilities, and thus appears to be of very limited utility. Additionally, it suffers rather box-like and potentially cumbersome packaging.

Similarly, EP Patent Publication No. 0,809,172 A2 to International Business Machines Corporation, which is incorporated herein by reference, illustrates a wearable computer having two separate components, one of which is mountable on the body and the other of which is handheld. Communication between the components can be through, e.g., RF, optical, or wired links. Embodiments of the device appear to be somewhat bulky and tending to restrict the user's movement especially when wired links are used and/or as the number of components increases. Further, embodiments of the device have limited processing capabilities.

In contrast, the latest wearable computing devices offer powerful computing technology in a comfortable, flexible package. Commonly assigned U.S. Pat. Nos. 5,285,398, 5,491,651, 5,798,907, and 5,581,492 to Janik, and commonly assigned U.S. Pat. Nos. 5,555,490 and 5,572,401 to Carroll, for example, all of which are incorporated herein by reference, disclose a number of extremely advantageous wearable-computing designs that can flex or otherwise accommodate the shape of a wearer's body. In a manner previously unknown, such designs are providing extensive computing capability in a comfortable, rugged, compact, easy-to-wear package.

Many wearable computing devices typically have relied on head-mounted displays (HMD's) and microphones for visual and voice interaction with a wearer/user. Although an HMD can allow the user of a wearable computing device to operate in basically a hands-free mode, HMD's can be quite uncomfortable to wear, relatively fragile, and can require cables extending from the head to the computer. These cables, of course, can get in the way and are especially undesirable in high-demand use situations, e.g., military applications. Typical HMD's can also block normal vision when not in use. Additionally, HMD's typically use up to 4 to 7 or more watts of power, requiring heavier batteries for sustained operation and adding more weight for the user to carry. Thus, HMD's and/or other head-mounted audio/video input/output devices often present significant disadvantages for the intermittent, highly portable user of a wearable computing device.

A need has arisen, therefore, to provide better visual, voice and other interaction with a user, in both wearable and non-wearable computing environments, and in other communications environments as well. As will be described, embodiments of the present invention combine computing power, durability, comfort and other advantages in a manner unknown in the prior art.

SUMMARY OF THE INVENTION

The present invention provides a body-wearable input/output device adapted for potential use with other wearable or remote computing devices. According to one embodiment, the device comprises a wrist-mountable interactive device having a retractable earbud speaker mechanism, microphone, display and transceiver, preferably positioned on a wristband. The device may be utilized, for example, as a cellular telephone. An interface device optionally includes an antenna integrated into wristband or built in close association therewith. Video, audio and data communications are facilitated through use of the varying components, and the interactive device can be used in conjunction with a remote computing device or server for enhanced capabilities. A wide variety of data/signal transfer technologies, including wireless, RF, optical and wired communication, are contemplated.

Further embodiments of the invention include multiple additional capabilities. When the earbud is retracted, it is mounted on one or more speakers for direct-on use. An amplifier located adjacent the speaker(s) amplifies and projects sounds that otherwise would emanate from the earbud. When the earbud is removed from the wristband, automatic switching occurs such that sound emanates solely from the earbud.

In a further embodiment, the interface device includes two banks of microphones, with one bank acting as a speaker or receiver and the other providing an ambient noise-cancellation function. In use, the microphone banks are preferably disposed approximately 180° apart on the user's wrist. Automatic switching of the speaking-microphone and noise-canceling-microphone banks' functions occurs to enhance ease of use, for example. According to a further embodiment, the microphone banks may be arranged in an array to be used in conjunction with algorithms to discern and/or eliminate noise for the purpose of recognition. Additionally, audio/proximity sensors can trigger the appropriate functionality in a specific bank.

BRIEF DESCRIPTION OF THE DRAWINGS

Embodiments of the invention will be described with respect to the figures, in which like reference numerals denote like elements, and in which.

DETAILED DESCRIPTION OF PREFERRED EMBODIMENTS

Primary embodiments of the invention provide a wrist-worn input/output device having a retractable earbud and a microphone. Voice communication with a wearable personal computing device is the primary contemplated application, but embodiments of the invention apply to many different computing and non-computing environments and applications. Full voice and display interface with a personal computer is achieved, e.g., via a wireless link between the wrist-worn device and the computer.

Figure 1:
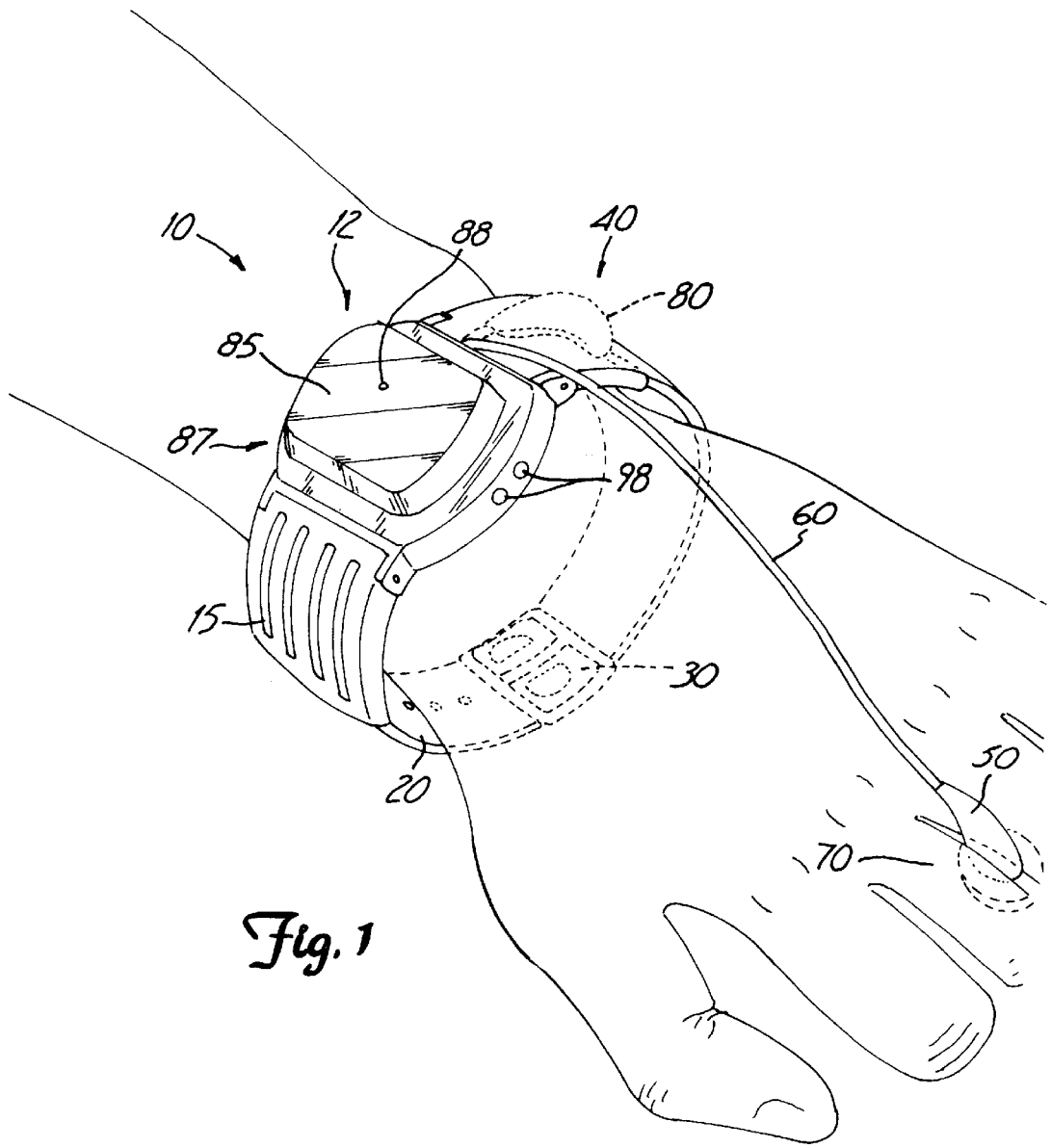
FIG. 1 is a perspective view of a wrist interactive device worn on the forearm of a user, according to an embodiment of the invention.

FIG. 1 shows wrist interactive device 10, referred to herein as an interface device, according to an embodiment of the invention. Although in a preferred embodiment the device is used on a wrist, the invention contemplates attachment to other parts or limbs of a user's body. The term limb is meant to include, but is not limited to, a user's wrist, arm, hand, leg, foot, ankle, torso, neck, head, or parts thereof, for example. Interface device 10 preferably includes interface electronics 14, housing or base structure 12 that substantially contains the electronics, RF interface/transceiver 15, preferably positioned as shown on mounting structure 20, for example a wristband, but also positionable at virtually any point around wristband 20 to suit particular situations and use scenarios. Interface device 10 also can include an antenna (not shown), built into or in close association with band 20, for example. Of course, embodiments of the invention contemplate a wide variety of technologies, including wireless communication such as RF, IR, ultrasonic, laser or optical, as well as wired and other communications technologies.

Significantly, interface device 10 includes input apparatus, such as microphone 30 and retractable earbud system 40. Retractable earbud-type speaker 50 is attached to the remainder of interface device 10 by retraction apparatus or cord 60, and preferably is shaped for comfortable placement between a user's fingers 70 as shown. Of course, earbud 50 can be held about its outer casing in a variety of configurations to suit a particular user, e.g., between the thumb and forefinger or between other fingers, secured in the palm or on the backside of the hand by some external means, or even placed directly in the ear, if needed. By earbud is meant an assistive listening device small in size which optionally may fit substantially inwardly from the user's outer ear or, alternatively, portions or substantially all of which may reside adjacent to but outwardly therefrom.

Figure 2:
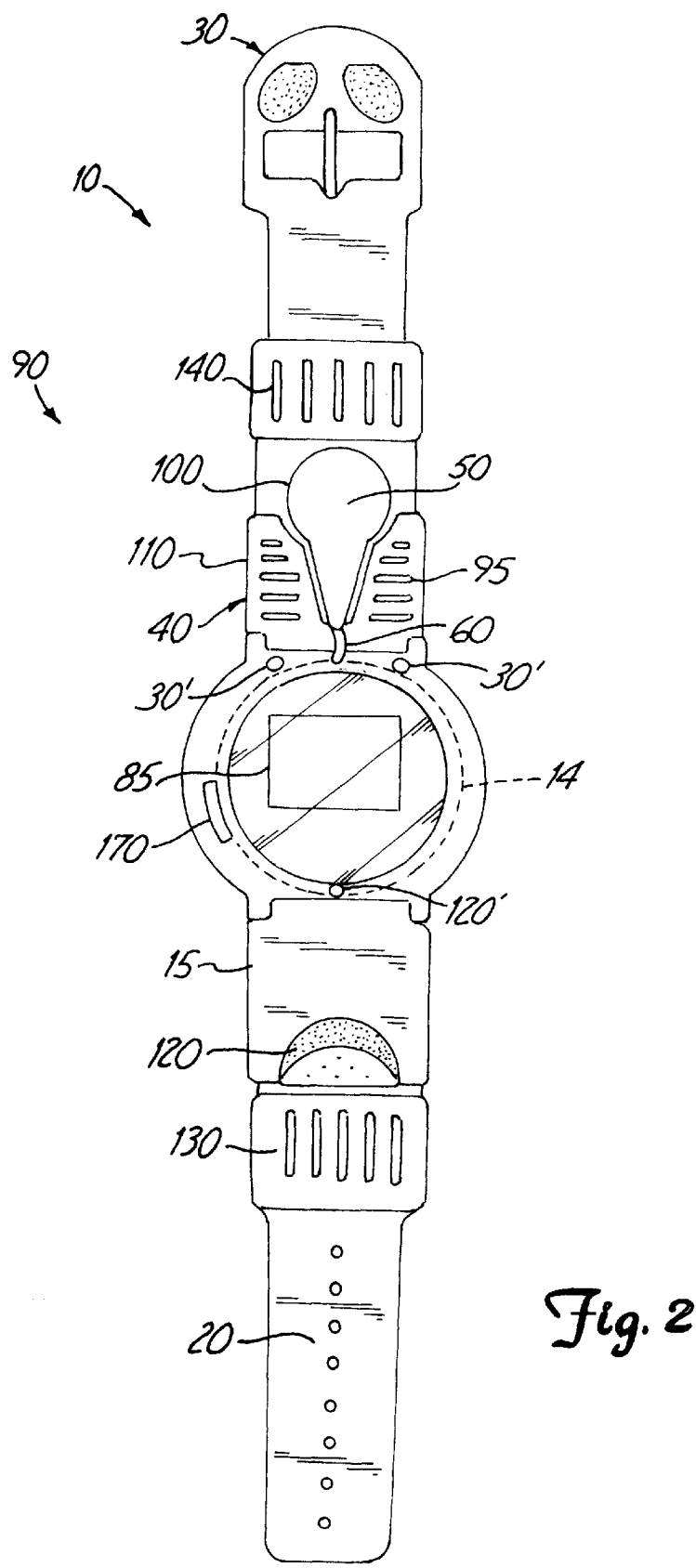
FIG. 2 is a plan view of a wrist interactive device according to an embodiment of the invention.
Figure 3:
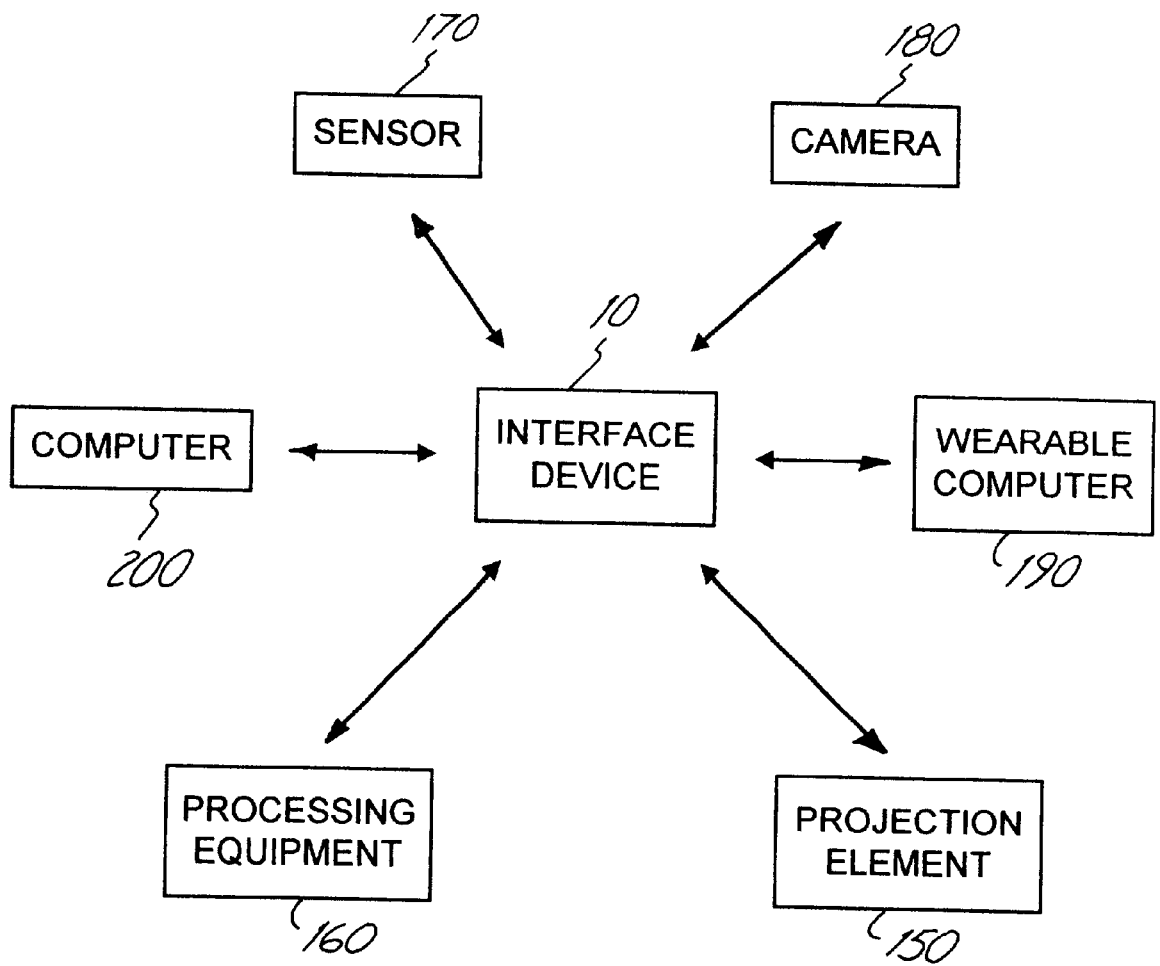
FIG. 3 is a schematic diagram of embodiments of the invention adapted for supporting enhanced communications capabilities.

According to preferred embodiments, a retracting/recoiling mechanism in an interior portion of interface device 10 takes up slack in cord 60 and draws earbud 50 toward a retracted position, indicated in FIG. 2 by dashed lines 80. In its retracted position, output apparatus, for example, earbud 50 can be snap-fit into an area on interface device 10, such that earbud 50 is secured to the remainder of interface device 10 and does not dangle or flop around when not in use. Alternatively, earbud 50 can reside in an appropriately shaped receiving structure on interface device 10 similar to a tongue-and-groove fit, for example. Earbud 50 can be custom fit, and the length and design of cord 60 can be chosen to suit a particular hand size or body morphology.

To use interface device 10 as, e.g., a cellular phone and/or to communicate with a body-worn personal computing device, for example, through a body-LAN radio or other short distance radio (such as Bluetooth RF), the user simply removes earbud 50 from its mount and places it between fingers 70. Then, the user places earbud 50 against the ear and microphone 30 near the mouth with palm against the side of the face, for example. The user's hand and fingers substantially block ambient noise and also enhance privacy by making it more difficult for others to overhear.

Upon terminating the phone call or other communication, the user simply can release earbud 50 from between the fingers, allowing the recoiling mechanism automatically to retract cord or tethering apparatus 60 and return earbud 50 to substantially its retracted position. Optionally, as described above, the user then can snap-fit or otherwise secure earbud 50 to the remainder of interface device 10. Of course, earbud 50 also can snap in automatically or otherwise fit into place upon release by fingers 70. According to a further alternative embodiment, the user can release earbud 50 from between the fingers while holding earbud 50 with the opposite hand. This allows slower, more controlled retraction by the recoiling device, as may be desirable in certain circumstances.

FIG. 1 illustrates a forehand configuration for interface device 10, wherein the user's left palm is placed against the left side of the face when interface device 10 is in use. A backhand configuration is also contemplated, however, in which the user wears interface device 10 on the left wrist but listens with the right ear. In backhand use, earbud 50 faces toward the backside of the hand (i.e., away from the palm), and the back of the left hand is placed against the right ear. Use with the wearer's right wrist, in both backhand and forehand configurations, is also contemplated, being effected by proper positioning of interface device 10. According to these embodiments, a microphone is positioned on the upper side of interface device 10 as viewed in FIG. 1, such that the microphone is in the vicinity of the user's mouth in the backhand configuration. As will be described shortly with respect to FIG. 2, interface device 10 actually can include two microphones, or banks of microphones, one at the upper side and one at the lower side of interface device 10.

Interface device 10 also includes display 85, which can encompass any miniature display technology, e.g., from a simple LED to a full-color, high-resolution screen. Display 85 can provide direct-view capabilities and enlarged-view capabilities using magnifying or other lens 88, for example. Lens 88 can be supported by an adjustable frame structure for adjusting the relative distance to the underlying display 85 and thus providing the desired magnification level. When earbud 50 of interface device 10 is in use, display device 85 is positioned advantageously close to the user's eyes.

Turning now to FIG. 2, earbud system 40 is shown in combination with a particular embodiment of interface device 10 that includes multiple additional capabilities. Retractable earbud 50 is mounted on a speaker mechanism 90, which becomes a standard speaker for direct-on use, e.g., while earbud 50 is retracted. Speaker mechanism 90 includes speaker or speakers 95 for this purpose. Amplifier 100, e.g., under earbud 50 and in audio communication with an acoustic chamber in speaker mechanism 90, amplifies and projects sounds that otherwise would emanate only from earbud 50. Automatic switching between speaker(s) 95 and earbud 50 also can occur, such that removing earbud 50 from mechanism 90 disconnects speaker(s) 95, similar to a telephone/speaker phone system. Simultaneous use of earbud 50 and speaker mechanism 90 is also contemplated. Speaker mechanism 90 also can include warning device 110, such as a vibrator or buzzer, for alerting the user of an incoming message, call, and/or other communication or activity optionally associated with a personal computer 200.

As mentioned earlier, interface device 10 can include two microphones: microphone 30 described above and another microphone 120, as shown in FIG. 2. According to preferred embodiments, microphones 30, 120 comprise noise-canceling microphone banks, adapted for positioning at approximately 180° from each other on opposite sides of the user's wrist when interface device 10 is in use. Automatic switching of the speaking-microphone and noise-canceling-microphone functions can occur from bank to bank, depending upon which bank is closer to the wearer's mouth during operation. For example, interface device 10 would utilize different banks for different tasks when used in a forehand as opposed to a backhand orientation. Various audio/proximity sensor(s) 170 positioned in association with interface device 10 can automatically trigger the appropriate functionality in a specific bank, depending on which orientation is in use. Banks 30, 120 can include ASIC-based noise-canceling technology, such as is available in chips from Andrea Electronics Corporation (AEC), to enable voice recognition in ambient noise up to approximately 130 Db or more. Optionally, microphone banks 30' and 120' may be arranged closer to display 85, as shown in FIG. 2, in a linear and/or non-linear array to be used in conjunction with algorithms to discern and eliminate noise similar to the AEC linear array.

Additionally, sensors 170 may be utilized in conjunction with lensing 88 to enable automatic sizing of communicated information on display 85, based on the distance from the user's eye or face to device 10, for example. Thus, as the distance increases, lensing 88 provides greater magnification to enhance viewing. Likewise, as the distance decreases, less magnification would be provided, thus enabling a greater amount of information to be communicated on display 85. Sensors 170 may also be utilized to provide multiple other viewing enhancement features to display 85. Sensors 170 may provide back-lighting or alter contrast between text and the background of display 85, depending on ambient light or other conditions. For example, bigger, brighter, and/or bolder text would automatically be provided in a dark or rainy environment to reduce user eye strain.

Wrist interface device 10 also includes batteries 130, 140, e.g. two in number. A user readily can insert and remove batteries 130, 140 from band 20, and can also use them interchangeably in other electronic devices. Power draw is configured and varied such that a user can remove and replace one of batteries 130, 140 without shutting down interface device 10. In other words, batteries 130, 140 preferably are hot-swappable. Additionally, band 20 of interface device 10 can include a docking port, (not shown) electrically connected to batteries 130, 140, for enabling interface device 10 to plug directly into a battery-charging unit for recharging, e.g. overnight or during other periods of nonuse.

Returning to a discussion of display 85 in interface device 10, shown in FIGS. 1–2, Colorado Microdisplay provides one example of a suitable product including a corded display engine and lighting scheme that enjoy low-power requirements, small size and high resolution. Other miniature-display makers include DisplayTech of Longmont, Colorado, and Kopin of Tauton, Mass. Display 85 also can use coherent fiber-optic rod and/or projection technology to route optical signals from a source to the screen or projection element 150. Inflatable lens-support technology can also be used to adjust the spacing between magnifying lens 88, or another type of primary lens, and the remainder of the display. A wide variety of displays 80 and corresponding lensing/transmission systems are contemplated for use according to the invention, not just the specific examples listed herein.

To accommodate bright or other visually difficult environments, a retractable/removable or permanent anti-glare screen, mesh, or other filtering apparatus can lie over or on display device 85. According to retractable/removable embodiments, the screen rolls up and rolls down over display device 85 in the manner similar to the rolling and unrolling of a carpet, or can extend and retract over display device 85 in the manner of a window shade. Snap-on connectors, hook-and-loop fasteners, and other adjustable support structure 87 or connection mechanisms are also contemplated.

According to alternative embodiments of the invention, display device 85 and any desired processing device or equipment 160 associated with it are held in a user's hand, or otherwise affixed on the user's body. A cord or cords running to display device 85 drape, e.g., between the thumb and forefinger of the user's hand, and extend(s) downwardly to the wrist interactive device, to a belt- or otherwise-mounted wearable personal computer 190, or to another desired device. Optionally, processing device 160 may be remotely located or otherwise physically separated from the user, for example, as part of a network.

Significantly, according to this embodiment, the display cord or cords can support a microphone at a predetermined distance downward from display device 85, such that the microphone advantageously is positioned close to the user's mouth when the display is placed in proximity to the user's eyes. The microphone can be directly mounted on the cord by a variety of fastening mechanisms, and can slide along the cord for desired positioning relative to the user's mouth or other location. By their very nature, miniature screens generally have to be held closer to the eye than screens of normal size; providing a microphone in automatic, close association with the user's mouth, therefore, is advantageous. For other handheld displays in wireless communication with a wearable-computing or other device, a cord or other support mechanism, preferably with shape-memory features, can hang down off the display unit to support a microphone in close proximity to the mouth.

Additionally, a noise-canceling microphone can be provided in connection with the cord- or other-supported microphones described above. A series of miniature microphones can be supported down the cord from the display, separated by desired distances and aimed in different directions. One or more of the microphones can be for verbal input from the user, and one or more others of the microphones, or the same microphone, can also be for noise-cancellation purposes. Supported microphones as described herein are expected to enjoy significant advantages in, e.g., video-conferencing, zoom-video and other high-demand applications.

Returning to transceiver 15, single RF transceiver chips currently available and/or soon-to-be available from, e.g., Texas Instruments, National Semiconductor and/or Motorola, are among the hardware possibilities contemplated, using 0.18 micron, 1.8 V power technologies and 2.4 GHz transmission capabilities, for example. Of course, a variety of transceiver specifications are available and usable according to the invention, depending on the particular application envisioned, cost factors, etc. Also envisioned for use, for example, are single-chip products operating at 900 MHz to 1.9 Ghz or more. Data rates for information transfer to wearable- or other-type computing devices will vary with each possible design, but preferably are high enough for at least text display. RF products ultimately will be capable of updating a full-color display, and have additional capabilities as well. Thus, embodiments according to the invention will substantially, if not entirely, eliminate the need for cabling to support interface with a wearable computer.

According to one embodiment, wrist interface device 10 optionally plugs into, e.g., a belt-worn wearable personal computer 190, thus bypassing RF communication and using a direct connection for higher-speed data transfer, as needed. Interface device 10 can include suitable connection port(s) 98, supported, e.g., by band 20 or any other portion of interface device 10. Wireless non-RF communication embodiments, including optical communication, are also contemplated, as described above.

Interface device 10 according to embodiments of the invention can include and/or communicate with a variety of sensors 170, including but not limited to motion, radar, heat, light, smoke, air-quality, oxygen, CO and distance. Medical monitoring sensors are also contemplated. Sensors 170 can be directed inwardly toward the user's body, or outwardly away from the body for, e.g., sensing the surrounding environment. Sensors 170 in communication with interface device 10 also can be strategically positioned or left behind to facilitate the communication of sensed information. For example, a firefighter entering a burning building may position sensor 170 to communicate the smoke and heat conditions to that firefighter and to others at the sensor-drop location. Remote sensors 170 can also be relatively fixed in position, as in the case of a maintenance worker wearing a interface device 10 that receives various signals from sensors 170 located in machines or other equipment for which the worker is responsible. A blind wearer of interface device 10 can employ a distance sensor 170 to determine distance to surrounding objects, for example, or a GPS unit for direction-finding. Other exemplary sensing capabilities are disclosed in one or more of the above-referenced Carroll and Janik patents.

According to one embodiment, interface device 10 includes or functionally supports a global positioning system/paper-map reading device, further enhancing its use, particularly in mission planning applications. Positioning capability using conventional paper maps is contemplated, in which an optical reader interfaces with the wrist-mounted device to scan and read precise coordinates on a paper map. According to one embodiment, the paper has barely visible dot patterns containing latitude and longitude data. This embodiment allows the user to determine exact locations and provides automatic-interpretation capabilities.

According to other embodiments, interface device 10 can directly and physically support video recording device or camera 180 optionally having a rotatable lens, using CMOS-type technology, for example. An image-flipping feature, either manually activated or voice-activated, flips or rotates the image viewed by the user depending on camera 180 orientation or user location. When a user looks at camera 180 to transmit a picture or video of himself or herself, camera 180 preferably functions in an expanded-view mode, capturing as much of the user's face or body as desirable. Alternatively, camera 180 can be aimed away at an angle to generate an image of the surrounding environment for either transmission to another location or for direct display by display device 85, for example. According to one embodiment, display device 85 includes an eyecup or other device extending to the vicinity of the user's eyelid, thereby providing shade from ambient light, protection from dust, etc. When this or any other embodiment disclosed herein includes an outwardly focussed lens, interface device 10 can effectively function as a handheld video camera recorder with video data transmission capability to, e.g., a wearable computer 190 or other computer 200. Optionally, interface device 10 includes an automatic zoom feature when used with camera 180, for example. As previously discussed, lensing 88 and distance or other sensors 170 provide the desired magnification level. In a preferred embodiment, one or more motion sensors 170 detect a sharp movement of the user's wrist, for example, to begin, reverse, and/or interrupt the magnification process. Thus, a user can cause zoom-in and zoom-out without direct use of the hands.

According to preferred embodiments, interface device 10, including its associated electronics, display device 85, and microphones/speakers, is packaged in an ergonomic, lightweight, easy-to-wear and easy-to-use configuration. Interface device 10 and its associated packaging is as comfortable as a wristwatch, yet effectively as powerful as at least a 180 MHz, 64 MB PC, for example, with advanced voice-recognition and interactive-communication and control features, via a wireless or other handshake link to wearable computer 190 or other computer 200. It is also contemplated that even greater processing power will be incorporated directly in interface device 10 as technology advances, such that interface device 10 will not be just for interfacing with another machine but will have completely independent processing power. Even if such processing power is not completely independent, to the extent that processing power can be located at interface device 10, the required RF, IR, or other data-transmission capabilities can be correspondingly reduced. Therefore, the term "interface device" throughout this application should be interpreted to include the possibility of processing at interface device 10. According to one embodiment, interface device 10 is itself a wearable personal computer with flexible circuitry between various components, to better accommodate the morphology of the wrist and eliminate the brick-like form associated with many wearable computers, as discussed in detail in the above-identified Janik and Carroll patents.

Embodiments of the invention are unique, durable and low-cost, based on, among other things, their small, wristwatch size, ease of mounting, reduced number of parts, substantial elimination of connectors and cables, and reduced power requirements. Certain embodiments will have one or more of the following features and capabilities:

RF digital link to a wearable PC for interface activities;

High-bandwidth, multiple-channel communication for series or parallel accommodation of multi-functional activities;

Advanced display features, including XVGA and future technologies;

Flexible-circuit design for improved adaptation to individual morphology;

Internal rechargeable battery(ies);

Noise-canceling microphone(s);

Wristband-storable, palm-locatable speaker(s);

Vibrator/buzzer user-alert device(s); and

Interface for an optical reader.

Embodiments of the invention eliminate the need for large, head-mounted and/or handheld displays and further provide convenient, two-way voice and graphical display communication between a user and a body-worn or other computer, and/or through the computer to other networks, computers, or individuals such as other wearable-computer users. Capabilities such as a cellular phone, television, video phone, paging device, etc. are contemplated. Military applications provide greatly enhanced battlefield communication capabilities and greatly increased battlefield situational awareness, among other advantages. Shipboard, aircraft or field maintenance and telemedicine applications, both in military and non-military settings, are among the many possible uses/situations that will directly benefit from wrist interactive device embodiments according to the invention.

Finally, very little if any computer processing need occur in interface device 10. At a minimum, interface device 10 need only support sound/display production and reception. Most processing activities can occur in the wearable computer 190 or other remote device RF- or otherwise linked with interface device 10. Alternatively, of course, interface device 10 itself can have powerful processing capabilities, as discussed above.

The specification is intended to be illustrative of the many variations and equivalents possible according to the invention. For example, communication with non-wearable computing devices, Local Area Networks, Wide Area Networks, repeater-transmission stations, and vehicles and/or vehicle-mounted electronic devices is contemplated. A wide variety of wristband types, both flexible and relatively inflexible, clasp-type, chain-link type, etc., are useable. Embodiments of the invention also can be mounted on other parts of the body, including the leg, arm, chest, or waist. Various other modifications in and changes to the above-described devices and methods will be apparent to those of ordinary skill and can be made without departing from the spirit and scope of the invention as defined in the following claims.

What is claimed is:

1. An interface device, comprising:

interface electronics;

a housing substantially covering the interface electronics;

a retractable earbud operably coupled to the interface electronics and detachably affixed to the housing, the retractable earbud being constructed for audio output to a user of the interface device;

retraction apparatus constructed to retract the earbud toward the housing; and at least one microphone operably connected to the interface electronics, the at least one microphone adapted for receiving audio input from the user;

wherein the at least one microphone comprises; a first microphone set positioned at a first location on the housing and a second microphone set positioned at a second location spaced from the first location; wherein the first microphone set functions as a receiver and the second microphone set functions to reduce ambient noise.

2. The device of claim 1, constructed and arranged to be mounted on a user's wrist.

3. The device of claim 2, further comprising:

a wristband for supporting the housing;

wherein the first microphone set is supported on the wristband on an opposite side of the user's wrist from the housing.

4. The device of claim 1, further comprising a first battery and a second battery for powering the device; further wherein the device is configured and constructed to maintain operation during removal of the first battery or the second battery.

5. The device of claim 1, further comprising a cord affixed to the earbud, the cord being operably coupled to the retraction apparatus.

6. The device of claim 5, wherein the retractable earbud is snap-fit into the housing.

7. The device of claim 5, wherein the retraction apparatus operates to automatically retract the retractable earbud toward the housing subsequent to use by a wearer.

8. The device of claim 1, wherein the earbud is constructed for support between fingers of the user; further wherein the first microphone set is constructed and arranged for support near the user's mouth when the earbud is between the fingers.

9. The device of claim 8, further comprising a wristband for supporting the microphone and the housing.

10. The device of claim 1 further comprising a sensor operably connected to the interface electronics, wherein output from the sensor activates interchange of functions between the first microphone set and the second microphone set.

11. The device of claim 1, wherein the earbud comprises a first speaker mechanism, the device further comprising a second speaker mechanism operably coupled to the interface electronics, wherein the earbud is removably mounted on the second speaker mechanism.

12. The device of claim 11, wherein the second speaker mechanism automatically turns on when the earbud is retracted and mounted on the second speaker mechanism.

13. The device of claim 11, further comprising a warning device, operably coupled to the interface electronics, constructed to alert the user of receipt of information.

14. The device of claim 13, wherein the warning device is selected from the group consisting of the second speaker mechanism, a buzzer and a vibrator.

15. The device of claim 11, wherein the earbud comprises a first speaker, the device further comprising a second speaker operably coupled to the interface electronics, wherein the second speaker automatically turns on when the first speaker is retracted.

16. The device of claim 1, in combination with a wearable personal computer, the interface device transferring data to the wearable personal computer, the interface device and the wearable personal computer being constructed and arranged to be worn on different parts of the body at the same time.

17. A wearable interface device, comprising:

output apparatus comprising a speaker, the output apparatus having an outer casing configured for grasping between fingers of the hand of a human wearer of the interface device, the output apparatus directing audio output to the wearer's ear when the wearer grasps the output apparatus between the fingers;

base structure, the base structure comprising receiving structure configured to receive and releasably hold the output apparatus when the output apparatus is released from between the fingers;

tethering apparatus connecting the output apparatus and the base structure, the tethering apparatus being constructed to hold the output apparatus in association with the base structure while allowing free movement of the output apparatus between the fingers and the base structure;

mounting structure supporting the base structure, the mounting structure being configured for disposition substantially surrounding a limb of the wearer; and input apparatus, the input apparatus comprising a first microphone and a second microphone, the input apparatus being supported by at least one of the mounting structure and the base structure, the input apparatus receiving audio input from the wearer while the output apparatus is disposed between the fingers, at least one of the first microphone and the second microphone being for noise cancellation.

18. The device of claim 17, wherein the tethering apparatus provides high-speed data communication between the output apparatus and the base structure.

19. The device of claim 17, further comprising a display positioned about the mounting structure, the display adapted to convey information to a wearer.

20. The device of claim 17, wherein the interface device is operably coupled to a processing device remote from the interface device to enable high speed communication and data transfer between the interface device and the processing device, the processing device being part of a wearable computer.

21. The device of claim 17, further comprising a video capturing device operably connected to the interface device, the video capturing device adapted to enable video communication.

22. The device of claim 17, wherein the interface device is operably coupled to a remote sensor for data transfer therefrom.

23. The device of claim 17, wherein the input/output device further comprises a connection port adapted for communication with a second device.

24. The device of claim 17, further comprising:
a transceiver located about the mounting structure, the transceiver adapted for communication with a processing device.

25. The device of claim 17, further comprising:
a second speaker coupled to the mounting structure, the second speaker adapted for providing audio output when the output apparatus is mounted in association with the base structure.

26. The device of claim 17, further comprising flexible circuitry to conform to the body shape of the wearer.

27. The device of claim 17, further comprising:
adjustable support structure affixed about the display;
lensing operatively coupled to the support structure, the lensing adapted to enhance viewing of the information on the display.

28. A method of audio communication comprising:
extending a speaker from a wearable interface device;
placing the speaker between the fingers of a human wearer in proximity with an ear of the wearer;
placing a first microphone supported by the interface adjacent the mouth of the wearer;
conducting audio communication using the microphone and speaker; and
providing a second microphone operably coupled with the first microphone, at least one of the first and second microphones being for noise cancellation.

29. The method of claim 28, further comprising releasing the speaker from the fingers upon completing the audio communication.

30. The method of claim 28, further comprising automatically retracting the speaker from the fingers toward the interface device after releasing the speaker from the fingers.

31. The method of claim 28, further comprising positioning the speaker between the index finger and the middle finger of the hand of the wearer such that the hand substantially blocks ambient noise from the speaker and/or one or more of the microphones.

32. The method of claim 28, further comprising snapping the speaker into the interface device when the audio communication is completed.

33. The method of claim 32, wherein said speaker is a first speaker, further comprising activating a second speaker of the interface device when the first speaker is snapped into the interface device.

34. The method of claim 28, further comprising transferring audio data to and from a wearable personal computer.

35. The device of claim 8, wherein the second microphone set is disposed away from the user's mouth on a side of the device opposite the first microphone set.

36. The combination of claim 16, wherein the interface device is constructed to be worn on the user's wrist and the wearable personal computer is constructed to be worn on the user's waist;
further wherein the interface device and the wearable personal computer are in wireless communication with each other.

37. The device of claim 17, wherein the second microphone is spaced from the first microphone;
further wherein the first microphone functions as a receiver and the second microphone functions to reduce ambient noise to create a noise-canceling microphone group.

38. The method of claim 28, wherein the second microphone is
a noise-canceling microphone spaced from said first microphone adjacent the mouth of the wearer to reduce ambient noise.

39. The device of claim 17, further comprising wireless communication apparatus for wireless communication with a wearable computer, the wearable computer being distinct from and worn simultaneously with the interface device.

40. The method of claim 28, further comprising wirelessly communicating data from the wearable interface device to a separate wearable personal computer.

* * * * *